United States Patent
Choi

(10) Patent No.: US 10,638,427 B2
(45) Date of Patent: Apr. 28, 2020

(54) SIGNAL TRANSMITTING/RECEIVING DEVICE AND METHOD IN MESH NETWORK

(71) Applicant: Samsung Electronics Co., Ltd., Gyeonggi-do (KR)

(72) Inventor: Dae-Kyu Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 78 days.

(21) Appl. No.: 15/577,206

(22) PCT Filed: May 27, 2016

(86) PCT No.: PCT/KR2016/005644
§ 371 (c)(1),
(2) Date: Nov. 27, 2017

(87) PCT Pub. No.: WO2016/190707
PCT Pub. Date: Dec. 1, 2016

(65) Prior Publication Data
US 2018/0092041 A1    Mar. 29, 2018

(30) Foreign Application Priority Data

May 27, 2015    (KR) .......................... 10-2015-0073684

(51) Int. Cl.
*H04W 52/02*    (2009.01)
*H04L 1/08*    (2006.01)
(Continued)

(52) U.S. Cl.
CPC .......... *H04W 52/0238* (2013.01); *H04L 1/08* (2013.01); *H04L 1/14* (2013.01); *H04L 1/1657* (2013.01);
(Continued)

(58) Field of Classification Search
None
See application file for complete search history.

(56) References Cited

U.S. PATENT DOCUMENTS

| 7,027,773 B1 | 4/2006 | McMillin |
| 7,626,966 B1 | 12/2009 | Ruiter et al. |

(Continued)

OTHER PUBLICATIONS

European Search Report dated Aug. 6, 2018 issued in counterpart application No. 16800346.5-1219, 13 pages.

(Continued)

*Primary Examiner* — Hassan A Phillips
*Assistant Examiner* — Gautam Sharma
(74) *Attorney, Agent, or Firm* — The Farrell Law Firm, P.C.

(57) ABSTRACT

The present invention relates to a technology for a sensor network, machine to machine (M2M) communication, machine type communication (MTC), and the Internet of things (IoT). The present invention can be used for intelligent services (smart home, smart building, smart city, smart car or connected car, health care, digital education, retailing, security and safety related services, and the like) based on the technology. The present invention provides a method by which a node transmits a signal in a mesh network, the method comprising the steps of: transmitting a packet; receiving at least one packet transmitted from at least one peripheral node except for the node, after transmitting the packet; determining whether the at least one peripheral node has normally received the packet on the basis of the at least one packet; and retransmitting the packet if it is determined that it is necessary to retransmit the packet, on the basis of the determination result.

19 Claims, 8 Drawing Sheets

(51) Int. Cl.
*H04L 1/18* (2006.01)
*H04L 1/14* (2006.01)
*H04L 1/16* (2006.01)
*H04L 5/00* (2006.01)
*H04W 74/08* (2009.01)
*H04L 1/00* (2006.01)
*H04L 29/08* (2006.01)
*H04W 40/12* (2009.01)
*H04W 84/18* (2009.01)

(52) U.S. Cl.
CPC ............ *H04L 1/188* (2013.01); *H04L 1/1825* (2013.01); *H04L 5/0055* (2013.01); *H04W 74/0816* (2013.01); *H04L 67/12* (2013.01); *H04L 2001/0097* (2013.01); *H04W 40/125* (2013.01); *H04W 84/18* (2013.01); *Y02D 70/00* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/168* (2018.01); *Y02D 70/20* (2018.01); *Y02D 70/21* (2018.01); *Y02D 70/22* (2018.01); *Y02D 70/26* (2018.01)

(56) References Cited

U.S. PATENT DOCUMENTS

| | | | |
|---|---|---|---|
| 7,746,837 B2 | 6/2010 | Oh et al. | |
| 7,941,149 B2 | 5/2011 | Wang et al. | |
| 2001/0046065 A1* | 11/2001 | Furukawa | G06F 3/121 358/1.15 |
| 2003/0135784 A1* | 7/2003 | Yamaguchi | H04L 1/1851 714/18 |
| 2004/0174825 A1 | 9/2004 | Li et al. | |
| 2006/0007887 A1* | 1/2006 | Kwon | H04L 1/1867 370/329 |
| 2006/0152344 A1 | 7/2006 | Mowery | |
| 2006/0174020 A1* | 8/2006 | Walls | H04L 12/1868 709/230 |
| 2007/0053307 A1* | 3/2007 | Greene | H04L 12/1854 370/252 |
| 2007/0064718 A1* | 3/2007 | Ekl | H04L 12/1868 370/432 |
| 2007/0280262 A1 | 12/2007 | Larsen et al. | |
| 2008/0031177 A1* | 2/2008 | Lee | H04H 20/72 370/312 |
| 2010/0153807 A1* | 6/2010 | Kakani | H04L 12/189 714/749 |
| 2011/0069653 A1* | 3/2011 | Wang | H04L 12/1868 370/312 |
| 2013/0315057 A1 | 11/2013 | Pope et al. | |
| 2014/0133382 A1* | 5/2014 | Shin | H04W 4/06 370/312 |
| 2014/0247821 A1 | 9/2014 | Yamada et al. | |

OTHER PUBLICATIONS

PCT/ISA/237 Written Opinion issued on PCT/KR2016/005644 (pp. 7).
PCT/ISA/210 Search Report issued on PCT/KR2016/005644 (pp. 3).
Lee, Ga-Won et al., Reliable Data Transfer using Overhearing for Implicit ACK, ICROS-SICE International Joint Conference, Aug. 18-21, 2009 Aug. 18-21, 2009, Fukuoka International Congress Center, Japan, Copyright 2009 SICE, pp. 1976-1979.
Maalel, Nourhene et al., Adaptive Reliable Routing Protocol for Wireless Sensor Networks, ICWMC 2013, The Ninth International Conference on Wireless and Mobile Communications, Jul. 2013, Nice, France, Copyright IARIA, 2013, pp. 52-55.
European Search Report dated Apr. 17, 2018 issued in counterpart application No. 16800346.5-1219, 11 pages.

* cited by examiner

SIGNAL TRANSMITTING/RECEIVING DEVICE AND METHOD IN MESH NETWORK

PRIORITY

This application is a National Phase Entry of International Application No. PCT/KR2016/005644, which was filed on May 27, 2016, and claims priority to Korean Patent Application No. 10-2015-0073684 filed on May 27, 2015, the content of each of which is incorporated herein by reference.

TECHNICAL FIELD

The present disclosure relates to an apparatus and method for transmitting/receiving a signal in a mesh network.

BACKGROUND ART

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged.

As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Machine type communication is rapidly evolving from an M2M communication concept which supports communication between people and things, or between things, based on a mobile communication network into a concept of interacting with all information of real and virtual worlds as well as things while extending its area to the Internet. Namely, the M2M communication that enables the intelligent communication between people and things, or between things, at anytime and anywhere in real time in a stable and convenient manner is extending its area to IoT while connecting all surrounding things through the Internet.

The IoT refers to a technology of connecting various types of things, which have a sensor and a communication function embedded therein, to the Internet. Here, the things include various embedded systems (a computer system of an electronic device such as a smart phone), such as home appliances, a mobile device, wearable computers, etc. The things connected to the IoT have to be connected to an internet based on a unique internet protocol (IP) address by which the things can be identified, and may have sensors embedded therein for acquiring information from an external environment.

Recently, IoT has been rapidly developed, so a Bluetooth scheme, specially, a Bluetooth scheme which supports a Bluetooth low energy (BLE) mode has been attracted. Generally, a user may control devices to which a BLE mode is applied using a portable terminal, e.g., a smart phone, so devices to which a BLE mode is applied has been increased.

There is a need for a scheme of transmitting/receiving a signal by applying a mesh network to the BLE mode since the devices to which the BLE mode is applied has been increased.

The above information is presented as background information only to assist with an understanding of the present disclosure. No determination has been made, and no assertion is made, as to whether any of the above might be applicable as prior art with regard to the present disclosure.

DETAILED DESCRIPTION OF THE INVENTION

Technical Problem

An embodiment of the present disclosure proposes an apparatus and method for transmitting/receiving a signal in a mesh network.

An embodiment of the present disclosure proposes a signal transmitting/receiving apparatus and method such that signal retransmission is possible in a mesh network.

An embodiment of the present disclosure proposes a signal transmitting/receiving apparatus and method for preventing ACKnowledgement (ACK) delay in a mesh network.

An embodiment of the present disclosure proposes a signal transmitting/receiving apparatus and method for decreasing a collision occurrence probability in a mesh network.

An embodiment of the present disclosure proposes a signal transmitting/receiving apparatus and method such that monitoring of channel status is possible in a mesh network.

An embodiment of the present disclosure proposes a signal transmitting/receiving apparatus and method for enhancing communication reliability in a mesh network.

Technical Solution

An embodiment of the present disclosure proposes a method for transmitting a signal by a node in a mesh network, and the method comprises: transmitting a packet; after transmitting the packet, receiving at least one packet transmitted from at least one neighbor node other than the node; determining whether the at least one neighbor node has normally received the packet based on the at least one packet; and retransmitting the packet upon determining that there is a need for retransmitting the packet based on the determined result.

An embodiment of the present disclosure proposes a node in a mesh network, and the node comprises: a transmitter configured to perform an operation of transmitting a packet; a receiver configured to receive at least one packet transmitted from at least one neighbor node other than the node after transmitting the packet; and a controller configured to perform an operation of determining whether the at least one neighbor node has normally received the packet based on the at least one packet, wherein, if the controller determines that there is a need for retransmitting the packet based on the determined result, the transmitter retransmits the packet.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Advantageous Effects

An embodiment of the present disclosure enables to transmit/receive a signal in a mesh network.

An embodiment of the present disclosure enables to transmit/receive a signal such that signal retransmission is possible in a mesh network.

An embodiment of the present disclosure enables to transmit/receive a signal such that ACKnowledgement (ACK) delay is prevented in a mesh network.

An embodiment of the present disclosure enables to transmit/receive a signal such that a collision occurrence probability is decreased in a mesh network.

An embodiment of the present disclosure enables to transmit/receive a signal such that monitoring of channel status is possible in a mesh network.

An embodiment of the present disclosure enables to transmit/receive a signal such that communication reliability is enhanced in a mesh network.

BRIEF DESCRIPTION OF DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

Figure 1:
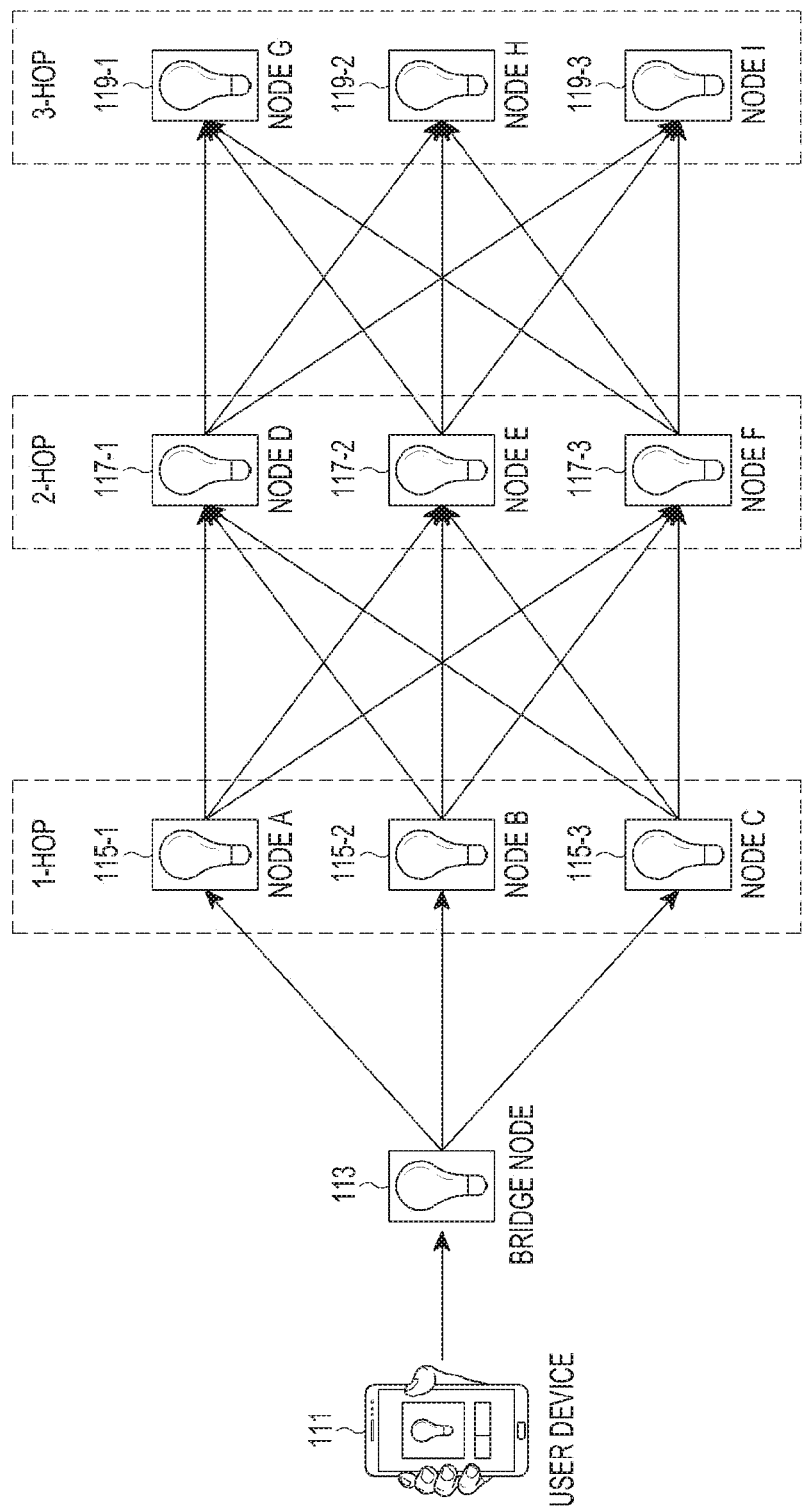
FIG. 1 schematically illustrates a structure of a BLE mesh network according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a user device and a node may be, for example, an electronic device.

An embodiment of the present disclosure proposes an apparatus and method for transmitting/receiving a signal in a mesh network.

An embodiment of the present disclosure proposes a signal transmitting/receiving apparatus and method such that signal retransmission is possible in a mesh network.

An embodiment of the present disclosure proposes a signal transmitting/receiving apparatus and method for preventing ACKnowledgement (ACK) delay in a mesh network.

An embodiment of the present disclosure proposes a signal transmitting/receiving apparatus and method for decreasing a collision occurrence probability in a mesh network.

An embodiment of the present disclosure proposes a signal transmitting/receiving apparatus and method such that monitoring of channel status is possible in a mesh network.

An embodiment of the present disclosure proposes a signal transmitting/receiving apparatus and method for enhancing communication reliability in a mesh network.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an evolved packet system (EPS), and a mobile internet protocol (Mobile IP) system, and/or the like.

In an embodiment of the present disclosure, for convenience, it will be assumed that a mesh network supports a flooding scheme, and the mesh network which supports the flooding scheme is, for example, a Bluetooth low energy (BLE) mesh network. The BLE mesh network denotes a mesh network supporting a BLE mode, and the BLE mesh network supports a flooding scheme using advertising channels.

A structure of a BLE mesh network according to an embodiment of the present disclosure will be described with reference to FIG. 1.

FIG. 1 schematically illustrates a structure of a BLE mesh network according to an embodiment of the present disclosure.

Referring to FIG. 1, the BLE mesh network uses BLE channels, and the BLE channels include, for example, total 40 channels, i.e., advertisement channels and data channels. The advertisement channels include, for example, 3 advertisement channels, i.e., an advertisement channel 37, an advertisement channel 38, and an advertisement channel 39, and are used for discovering a service and/or a device. The data channels include, for example, 37 data channels, and are used for transmitting/receiving data traffic. Each of the 40 channels occupies 2 MHz, and a Gaussian Frequency Shift Keying (GFSK) scheme is used as, for example, a modulation scheme for the 40 channels.

The BLE mesh network includes a user device 111, a bridge node 113, and a plurality of nodes, e.g., total 9 nodes, i.e., a node A 115-1, a node B 115-2, a node C 115-3, a node D 117-1, a node E 117-2, a node F 117-3, a node G 119-1, a node H 119-2, and a node I 119-3.

The user device 111 may be, for example, a smart phone, and the bridge node 113 directly communicates with the user device 111.

Each of the node A 115-1, the node B 115-2, the node C 115-3, the node D 117-1, the node E 117-2, the node F 117-3, the node G 119-1, the node H 119-2, and the node I 119-3 may be one of a smart Light Emitted Diode (LED), a thermometer, a washing machine, a smart refrigerator, a robot cleaner, a smart Television (TV), a digital camera, a smart phone, a wearable device, and/or the like. An own function of the smart LED, the thermometer, and/or the like is relatively simple, so a hardware for providing a specific service, e.g., an Internet of Things (IoT) service may be also defined as small things which are implemented small, the washing machine, the smart refrigerator, the robot cleaner, and/or the like may be defined as big things without a display, and the smart TV, the digital camera, the smart phone, the wearable device, and/or the like may be defined as big things with a display.

Each of the node A 115-1, the node B 115-2, the node C 115-3, the node D 117-1, the node E 117-2, the node F 117-3, the node G 119-1, the node H 119-2, and the node I 119-3 may transmit/receive sensor data measured through a sensor included in the inside thereof or data (for example, data with a packet format) including information collected from a corresponding node, so corresponding information may be collected in the user device 111.

Each of the node A 115-1, the node B 115-2, the node C 115-3, the node D 117-1, the node E 117-2, the node F 117-3, the node G 119-1, the node H 119-2, and the node I 119-3 may provide an external service server with the sensor data measured through the sensor included in the inside thereof or the data including the information collected from the corresponding node thereby a service which is based on each information may be provided. For example, an indoor temperature measured by a thermometer may be provided to the user device 111, so the indoor temperature may be adjusted.

In FIG. 1, the BLE mesh network has been described with, for example, a case that the BLE mesh network provides an IoT service, however, it will be noted that a service which the BLE mesh network provides is not limited to only an IoT service.

Meanwhile, there is no detailed consideration for the following aspects in a BLE mesh network which has been proposed up to now.

(1) Aspect of Signal Retransmission

A BLE mesh network which has been proposed up to now does not consider a case that data is lost, so there is no node for performing a retransmitting operation on the lost data if the data is lost in the BLE mesh network. If the data is lost in the BLE mesh network, a final node which needs to receive data of a user device as well as the user device may not recognize whether there is data transmission.

In a current BLE mesh network, a mesh use case has been implemented centering on a control application such as light control, home control, and/or the like, so reliability may be very important factor.

As described above, a current BLE mesh network does not consider data retransmission, so reliability is degraded when data loss occurs.

So, an embodiment of the present disclosure proposes a signal transmitting/receiving scheme such that signal retransmission is possible in order to enhance reliability in a BLE mesh network, this will be described below, and a detailed description thereof will be omitted herein.

(2) Aspect of ACK Delay

An ACK delay phenomenon which may occur in a general BLE mesh network will be described with reference to FIG. 2.

Figure 2:
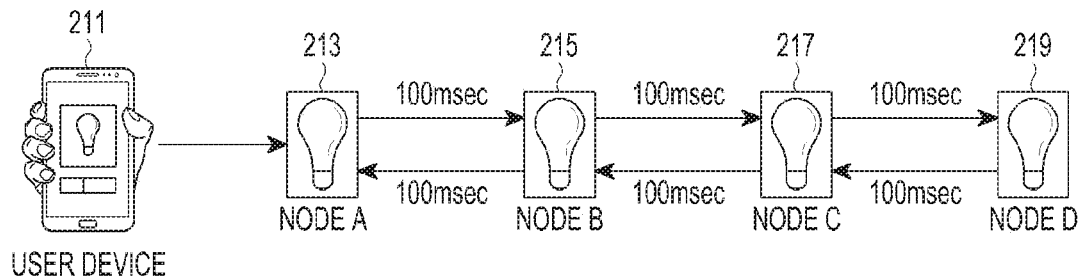
FIG. 2 schematically illustrates an ACK delay phenomenon which may occur in a general BLE mesh network.

FIG. 2 schematically illustrates an ACK delay phenomenon which may occur in a general BLE mesh network.

Referring to FIG. 2, the BLE mesh network includes a user device 211, a node A 213, a node B 215, a node C 217, and a node D 219. It will be assumed that each of the node A 213, the node B 215, the node C 217, and the node D 219 is, for example, a smart LED. The node A 213 is a bridge node.

Firstly, it needs to pass total 4 hops from the user device 211 in order for the user device 211 to turn on the node D 219. In a current BLE mesh network, a mesh network is configured using an advertisement channel, so corresponding data, i.e., a packet including a turn-on command for turning on the node D 219 is transmitted from the user device 211 to the node D 219, and then the node D 219 may transmit ACK for the corresponding data transmitted by the user device 211 to the user device 211.

So, the user device 211 needs to wait for time of D (delay time per hop)*K (the number of hops)*2+α(node processing delay time)*4 until receiving an ACK for data transmitted by the user device 211.

In an example shown in FIG. 2, the user device 211 may receive the ACK for the data transmitted by the user device 211 only after time of 100 msec*3*2+100*4, i.e., time of about 1 sec (1000 msecs) elapses.

As described above, in a current BLE mesh network, significant ACK delay occurs, so an embodiment of the present disclosure proposes a signal transmitting/receiving scheme for preventing ACK delay in a BLE mesh network, this will be described below, and a detailed description thereof will be omitted herein.

(3) Aspect of Collision Occurrence Probability

A collision phenomenon which may occur in a general BLE mesh network will be described with reference to FIG. 3.

Figure 3:
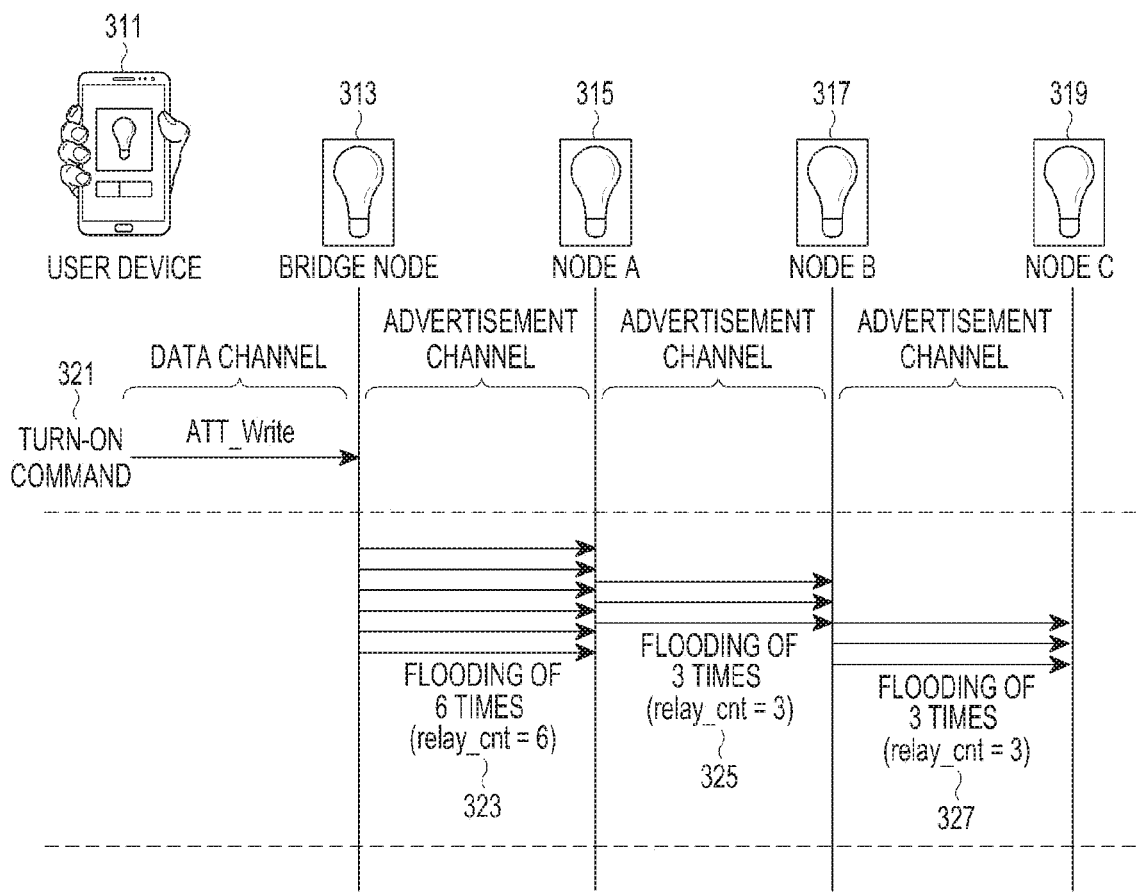
FIG. 3 schematically illustrates a collision phenomenon which may occur in a general BLE mesh network.

FIG. 3 schematically illustrates a collision phenomenon which may occur in a general BLE mesh network.

Referring to FIG. 3, the BLE mesh network includes a user device 311, a bridge node 313, a node A 315, a node B 317, and a node C 319. It will be assumed that each of the node A 315, the node B 317 and the node C 319 is, for example, a smart LED.

The user device 311 transmits a packet including a turn-on command to the bridge node 313 through a data channel in order to turn on the node C 319 (321), and the bridge node 313 floods a packet received from the user device 311 through advertisement channels corresponding to a value of a preset relay count (relay_cnt). For example, the value of the relay_cnt of the bridge node 313 is set to 6 (relay_cnt=6), so the bridge node 313 floods a packet received from the user device 311 through advertisement channels total 6 times. Here, the packet includes a turn-on command which turns on the node C 319, the number of the advertisement channels is 3, so the bridge node 313 floods the packet total 18 times.

The next node, i.e., the node A 315, receiving the packet from the bridge node 313, floods the packet received from the bridge node 313 corresponding to a preset relay_cnt. For example, a value of the relay_cnt of the node A 315 is set to 3 (relay_cnt=3), so the node A 315 floods the packet received from the bridge node 313 total 3 times through the advertisement channels. Here, the number of the advertisement channels is 3, so the node A 315 floods the packet total 9 times.

The next node, i.e., the node B 317, receiving the packet from the node A 315, floods the packet received from the node A 315 corresponding to a preset relay_cnt. For example, a value of the relay_cnt of the node B 317 is set to 3 (relay_cnt=3), so the node B 317 floods the packet received from the node A 315 total 3 times through the advertisement channels. Here, the number of the advertisement channels is 3, so the node B 317 floods the packet total 9 times.

As described above, a relay_cnt value of each node is set to a predetermined fixed-value, so the more increased a density of node in the BLE mesh network is, the more increased a probability that collision occurs is.

So, an embodiment of the present disclosure proposes a signal transmitting/receiving scheme for decreasing a collision occurrence probability in a BLE mesh network, this will be described below, so a detailed description thereof will be omitted herein.

In an embodiment of the present disclosure, if a specific node has data to be transmitted in a BLE mesh network, the specific node periodically overhears data transmitted by other nodes except for the specific node after transmitting the data. Here, the overhearing operation will be described below.

If data is transmitted in an order of node A→node B→node C, the node A overhears data transmitted from the node B to the node C after transmitting data to the node B. Upon detecting that the node B transmits, to the node C, data identical to data transmitted by the node A based on the overhearing result, the node A may determine that the data transmitted by the node A has been normally transmitted to the node B.

Meanwhile, the specific node estimates channel status based on the overheard data, and determines a value of a relay_cnt based on the estimated channel status. Here, the value of the relay_cnt determines the number of times of flooding for corresponding data, and if the value of the relay_cnt is adaptively changed based on channel status, a collision occurrence probability may decrease.

If data overheard by the specific node is not 100% consistent with data transmitted by the specific node, the specific node determines that an arbitrary node among neighbor nodes of the specific node does not receive the data transmitted by the specific node and retransmits corresponding data.

An example of an inner structure of a node in a BLE mesh network according to an embodiment of the present disclosure will be described with reference to FIG. 4.

Figure 4:
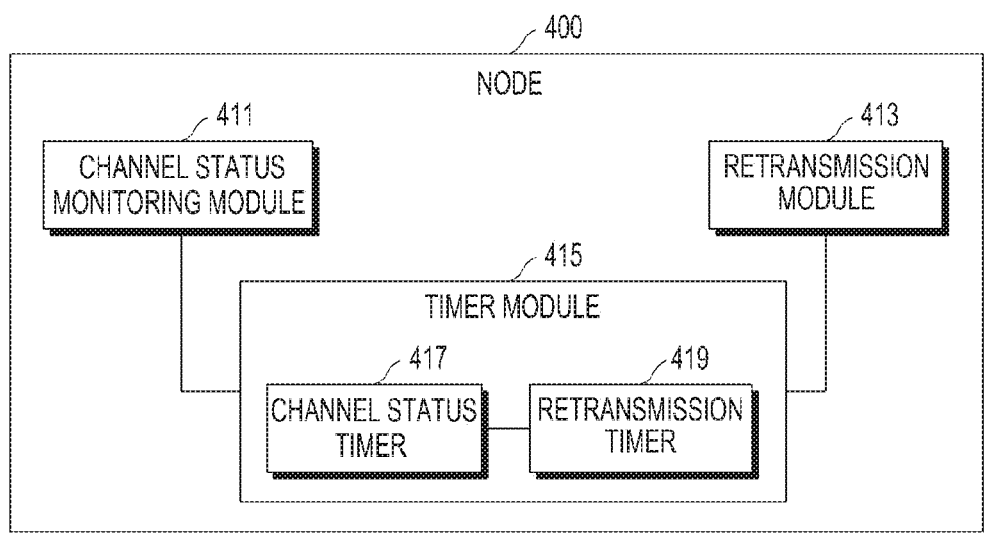
FIG. 4 schematically illustrates an example of an inner structure of a node in a BLE mesh network according to an embodiment of the present disclosure.

FIG. 4 schematically illustrates an example of an inner structure of a node in a BLE mesh network according to an embodiment of the present disclosure.

Prior to a description of FIG. 4, a node 400 as shown in FIG. 4 may be a bridge node, and may be nodes other than the bridge node.

Referring to FIG. 4, the node 400 includes a channel status monitoring module 411, a retransmission module 413, and a timer module 415.

The timer module 415 includes a channel status timer 417 and a retransmission timer 419.

The channel status monitoring module 411 monitors channel status based on the channel status timer 417, and it will be assumed that a timer value of the channel status timer 417 is, for example, T1. An operation of monitoring the channel status will be described below, and a detailed description thereof will be omitted herein.

The retransmission module 413 determines whether to retransmit corresponding data, i.e., a corresponding packet based on the retransmission timer 419, and it will be assumed that a timer value of the retransmission timer 419 is, for example, "T2". That is, the retransmission module 413 performs an overhearing operation for neighbor nodes during time which corresponds to the timer value T2 of the retransmission timer 419, and determines whether to retransmit the corresponding packet based on the overhearing operation. In an embodiment of the present disclosure, it will be assumed that the timer value T1 of the channel status timer 417 is set to a value greater than the timer value T2 of the retransmission timer 419. An operation of determining whether to retransmit the corresponding packet will be described below, and a detailed description thereof will be omitted herein.

Although the channel status monitoring module 411, the retransmission module 413, and the timer module 415 are described as separate units in the node 400 in FIG. 4, it is to be understood that the node 400 may be implemented with a form into which at least two of the channel status monitoring module 411, the retransmission module 413, and the timer module 415 may be incorporated. The node 400 may be implemented with one processor.

Although the channel status timer 417 and the retransmission timer 419 are described as separate units in the timer module 415 in FIG. 4, it is to be understood that the timer module 415 may be implemented with one processor.

An example of an inner structure of a node in a BLE mesh network according to an embodiment of the present disclosure has been described with reference to FIG. 4, and a channel scanning process of a node in a BLE mesh network according to an embodiment of the present disclosure will be described with reference to FIG. 5.

Figure 5:
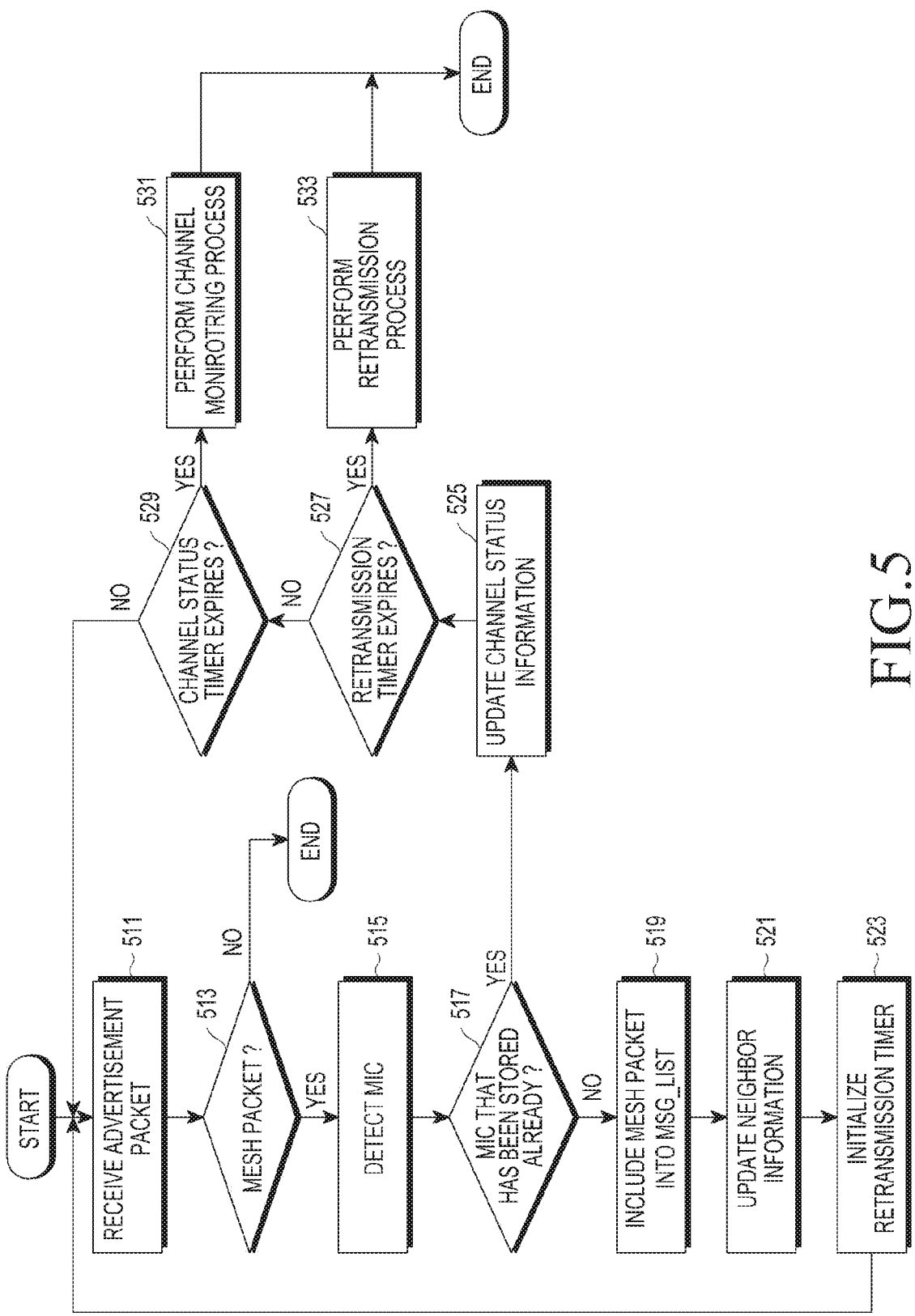
FIG. 5 schematically illustrates a channel scanning process of a node in a BLE mesh network according to an embodiment of the present disclosure.

FIG. 5 schematically illustrates a channel scanning process of a node in a BLE mesh network according to an embodiment of the present disclosure.

Prior to a description of FIG. 5, a channel scanning process denotes a process of continuously scanning, i.e., overhearing data transmitted by neighbor nodes of the node. The channel scanning process, i.e., the overhearing process is performed based on a message list (MSG_List), a neighbor list (Neighbor_List), a channel status timer, and a retransmission timer. The MSG_List includes messages transmitted from neighbor nodes, i.e., messages received by a corresponding node from the neighbor nodes. The MSG_List includes only one message with the same message integration check (MIC) value. It will be assumed that the number of messages which may be included in the MSG_List is up to Max_List. The Neighbor_List is a list including identifiers for the neighbor nodes.

Referring to FIG. 5, the node periodically scans whether an advertisement packet is received at operation 511, and if the advertisement packet is received while performing the scanning operation, proceeds to operation 513. The scanning operation is performed based on a channel status timer and a retransmission timer, and the channel status timer and the retransmission timer also start if the scanning operation starts.

The node determines whether the advertisement packet is a mesh packet at operation 513. If the advertisement packet is the mesh packet, the node proceeds to operation 515. The node detects an MIC value of the mesh packet, and proceeds to operation 517. The node determines whether the detected MIC value is equal to an MIC value which the node has been already stored at operation 517. If the detected MIC value is not equal to the MIC value which the node has been already stored, the node proceeds to operation 519. The fact that the detected MIC value is not equal to the MIC value which the node has been already stored means that a packet corresponding to the detected MIC value is a new message, not messages included in the MSG_List managed by the node.

The node includes the received mesh packet into the MSG_List at operation 519, and proceeds to operation 521. The node updates neighbor information at operation 521, and proceeds to operation 523. The neighbor information includes num_neighbors as a parameter indicating the number of neighbor nodes, and addr[Neighbor_MAC] including medium access control (MAC) addresses of the neighbor nodes. If a MAC address of a node transmitting the received mesh packet is not included in the addr[Neighbor_MAC] at operation 521, the node includes the MAC address of the node transmitting the received mesh packet into the addr [Neighbor_MAC], and updates the neighbor information by increasing a value of the num_neighbors by a preset value, e.g., 1. The node initializes the channel scanning process, that is, the node initializes the retransmission timer at operation 523, and returns to operation 511.

If the detected MIC value is equal to the MIC value which the node has been already stored at operation 517, the node proceeds to operation 525. The node updates channel status information, for example, the node increases a value of num_acks as a parameter indicating the number of ACKs by a preset value, e.g., 1 at operation 525, and proceeds to operation 527. In an embodiment of the present disclosure, if a mesh packet with an MIC value which is equal to an MIC value which has been already stored in a BLE mesh network is received, this is regarded as an ACK, so a value of num_acks is increased according to the received mesh packet.

The node determines whether the retransmission timer expires at operation 527. If the retransmission timer does not expire, the node proceeds to operation 529. The node determines whether the channel status timer expires at operation 529. If the channel status timer does not expire, the node returns to operation 511.

If the channel status timer expires at operation 529, the node proceeds to operation 531. The node performs a channel monitoring process at operation 531. The channel monitoring process will be described with reference to FIG. 6, and a detailed description thereof will be omitted herein.

If the retransmission timer expires at operation 527, the node proceeds to operation 533. The node performs a retransmitting process at operation 533. The retransmitting process will be described with reference to FIG. 7, and a detailed description thereof will be omitted herein.

Although FIG. 5 illustrates a channel scanning process of a node in a BLE mesh network according to an embodiment of the present disclosure, various changes could be made to FIG. 5. For example, although shown as a series of operations, various operations in FIG. 5 could overlap, occur in parallel, occur in a different order, or occur multiple times.

A channel scanning process of a node in a BLE mesh network according to an embodiment of the present disclosure has been described with reference to FIG. 5, and a channel monitoring process of a node in a BLE mesh network according to an embodiment of the present disclosure will be described with reference to FIG. 6.

Figure 6:
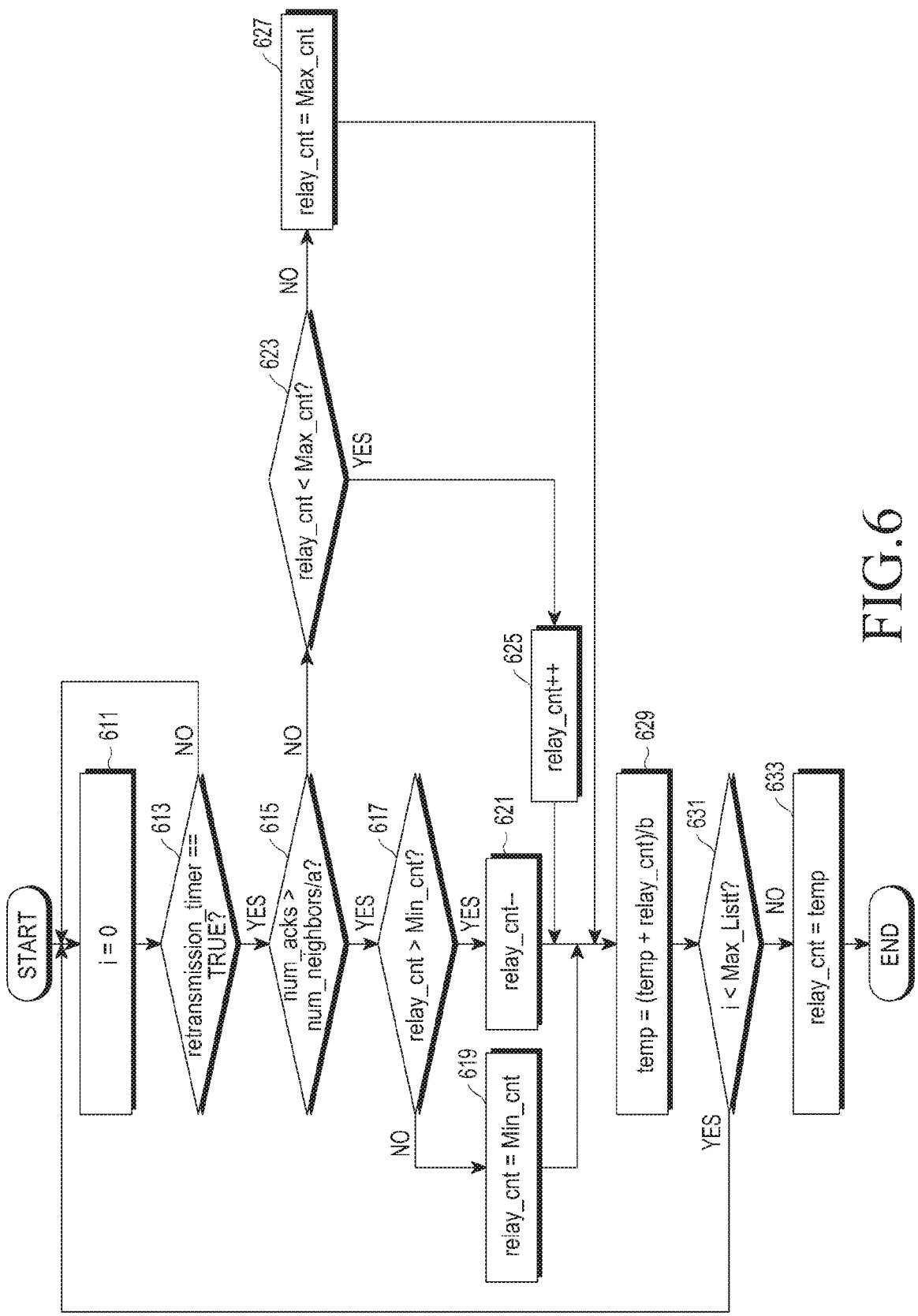
FIG. 6 schematically illustrates a channel monitoring process of a node in a BLE mesh network according to an embodiment of the present disclosure.

FIG. 6 schematically illustrates a channel monitoring process of a node in a BLE mesh network according to an embodiment of the present disclosure.

Prior to a description of FIG. 6, it will be noted that a channel monitoring process as shown in FIG. 6 is a channel monitoring process which corresponds to operation 531 in FIG. 5.

Referring to FIG. 6, the node initializes a variable i, that is, the node set a value of the variable i to zero (0) (i=0) at operation 611, and proceeds to operation 613. The variable i is a variable which corresponds to an MSG_List, and corresponds to a message i among messages included in the MSG_List. That is, the fact that a variable i is set means that the channel monitoring process is a channel monitoring process for a message i. So, the value of the variable i has a value which is equal to or less than Max_List as a maximum number of messages which may be included in the MSG_List (i≤Max_List).

The node determines whether a timer value of a retransmission timer is equal to "TRUE" at operation 613. The TRUE indicates a value which is equal to a timer value T2 of the retransmission timer. If the timer value of the retransmission timer is not set to TRUE, the node returns to operation 611.

If the timer value of the retransmission timer is set to TRUE, the node proceeds to operation 615. The node determines a value of num_acks is greater than a preset value, e.g., num_neighbors/a at operation 615. Here, "a" is an example of a margin value for retransmission, and in an embodiment of the present disclosure, it will be assumed that the margin value "a" is set to, for example, "2".

If the value of num_acks is greater than num_neighbors/a at operation 615, and proceeds to operation 617. The fact that the value of num_acks is greater than num_neighbors/a means that current channel status is relatively good. The node determines whether a value of relay_cnt is greater than a preset value, e.g., a minimum count (Min_cnt) at operation 617. Here, Min_cnt denotes a minimum relay_cnt value with which the BLE mesh network may reliably support data. If the value of the relay_cnt is not greater than Min_cnt, the node proceeds to operation 619. The node sets the value of the relay_cnt to Min_cnt, and proceeds to operation 629.

If the value of the relay_cnt is greater than Min_cnt at operation 617, the node proceeds to operation 621. The node decreases the value of the relay_cnt by a preset value, e.g., 1 at operation 621, and proceeds to operation 629.

If the value of the num_acks is not greater than num_neighbors/a at operation 615, that is, if the value of the num_acks is equal to or less than num_neighbors/a, the node proceeds to operation 623. The fact that the value of the num_acks is equal to or less than num_neighbors/a means that current channel status is relatively bad. The node determines whether the value of the relay_cnt is less than a preset value, e.g., maximum count (Max_cnt) at operation 623. Here, Max_cnt denotes a maximum relay_cnt value with which the BLE mesh network may reliably support data. If the value of the relay_cnt is less than Max_cnt, the node proceeds to operation 625. The node increases the value of the relay_cnt by a preset value, e.g., 1 at operation 625, and proceeds to operation 629.

If the value of the relay_cnt is not less than Max_cnt, that is, if the value of the relay_cnt is equal to or greater than Max_cnt, the node proceeds to operation 627. The node sets the value of the relay_cnt to Max_cnt at operation 627, and proceeds to operation 629. The node sets a value of a variable temp to (temp+relay_cnt)/b at operation 629, and proceeds to operation 631. Here, "b" is an example of a margin value for retransmission, and, in an embodiment of the present disclosure, it will be assumed that the margin value "b" is set to, for example, "2". Further, a value of the variable temp is set to Min_cnt upon initialization (temp=Min_cnt).

The node determines whether the value of the variable i is less than Max_List at operation 631. If the value of the variable i is less than Max_List, the node returns to operation 611.

If the value of the variable i is not less than Max_List, that is, if the value of the variable i is equal to or greater than Max_List, the node proceeds to operation 633. The node sets the value of the relay_cnt to the value of the temp (relay_cnt=temp) at operation 633. Finally, the value of the relay_cnt applied to the node is the value of the temp.

Although FIG. 6 illustrates a channel monitoring process of a node in a BLE mesh network according to an embodiment of the present disclosure, various changes could be made to FIG. 6. For example, although shown as a series of operations, various operations in FIG. 6 could overlap, occur in parallel, occur in a different order, or occur multiple times.

A channel monitoring process of a node in a BLE mesh network according to an embodiment of the present disclosure has been described with reference to FIG. 6, and a retransmitting process of a node in a BLE mesh network according to an embodiment of the present disclosure will be described with reference to FIG. 7.

Figure 7:
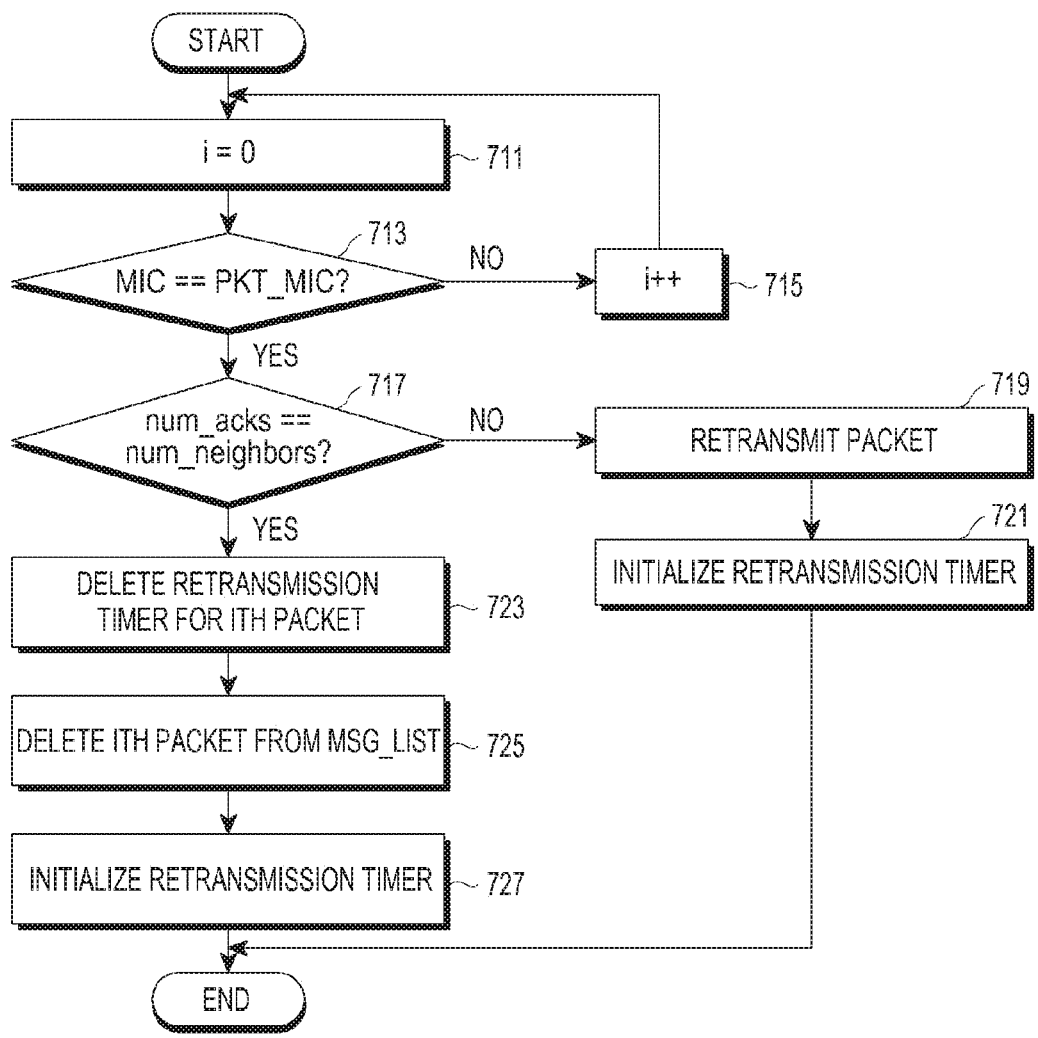
FIG. 7 schematically illustrates a retransmitting process of a node in a BLE mesh network according to an embodiment of the present disclosure.

FIG. 7 schematically illustrates a retransmitting process of a node in a BLE mesh network according to an embodiment of the present disclosure.

Prior to a description of FIG. 7, it will be noted that a retransmitting process as shown in FIG. 7 is a retransmitting process which corresponds to operation 533 in FIG. 5.

Referring to FIG. 7, the node initializes a variable i for the ith message, i.e., the ith mesh packet, that is, the node sets a value of the variable i to zero (0) (i=0) at operation 711, and proceeds to operation 713. Here, the variable i is a variable which corresponds to a MSG_List, and corresponds to a message i among messages included in the MSG_List. That is, the fact that the variable is set means that the retransmitting process is a retransmitting process for the message i. So, the value of the variable i has a value which is equal to or less than Max_List as a maximum number of messages which may be included in the MSG_List (i≤Max_List).

The node determines whether a value of a detected MIC is equal to PKT_MIC at operation 713. Here, PKT_MIC denotes an MIC value of a mesh packet, i.e., a message, which the node transmits at a corresponding timing. That is, if the value of the detected MIC is equal to PKT_MIC, it means that the node receives a mesh packet which other node floods and which is identical to a mesh packet transmitted by the node. If the value of the MIC is not equal to PKT_MIC, the node proceeds to operation 715. The node increases the value of the variable i by a preset value, e.g., 1 at operation 715, and proceeds to operation 711.

If the value of the MIC is equal to PKT_MIC, the node proceeds to operation 717. The node determines whether a value of a num_acks is equal to num_neighbors at operation 717. If the value of the num_acks is not equal to num_neighbors, the node proceeds to operation 719. The node retransmits a mesh packet which has been transmitted already at operation 719, and proceeds to operation 721. The node initializes a retransmission timer according to the retransmission of the mesh packet at operation 721.

If the value of the num_acks is equal to num_neighbors, the node proceeds to operation 723. The fact that the value of the num_acks is equal to num_neighbors means that all of neighbor nodes of the node have normally received the ith mesh packet transmitted by the node.

The node deletes a retransmission timer for the ith mesh packet at operation 723, and proceeds to operation 725. The node deletes the ith mesh packet from an MSG_List managed by the node at operation 725, and proceeds to operation 727. The node initializes a retransmission timer at operation 727.

Although FIG. 7 illustrates a retransmitting process of a node in a BLE mesh network according to an embodiment of the present disclosure, various changes could be made to FIG. 7. For example, although shown as a series of operations, various operations in FIG. 7 could overlap, occur in parallel, occur in a different order, or occur multiple times.

A retransmitting process of a node in a BLE mesh network according to an embodiment of the present disclosure has been described with reference to FIG. 7, and an operating process of nodes in a BLE mesh network according to an embodiment of the present disclosure will be described with reference to FIG. 8.

Figure 8:
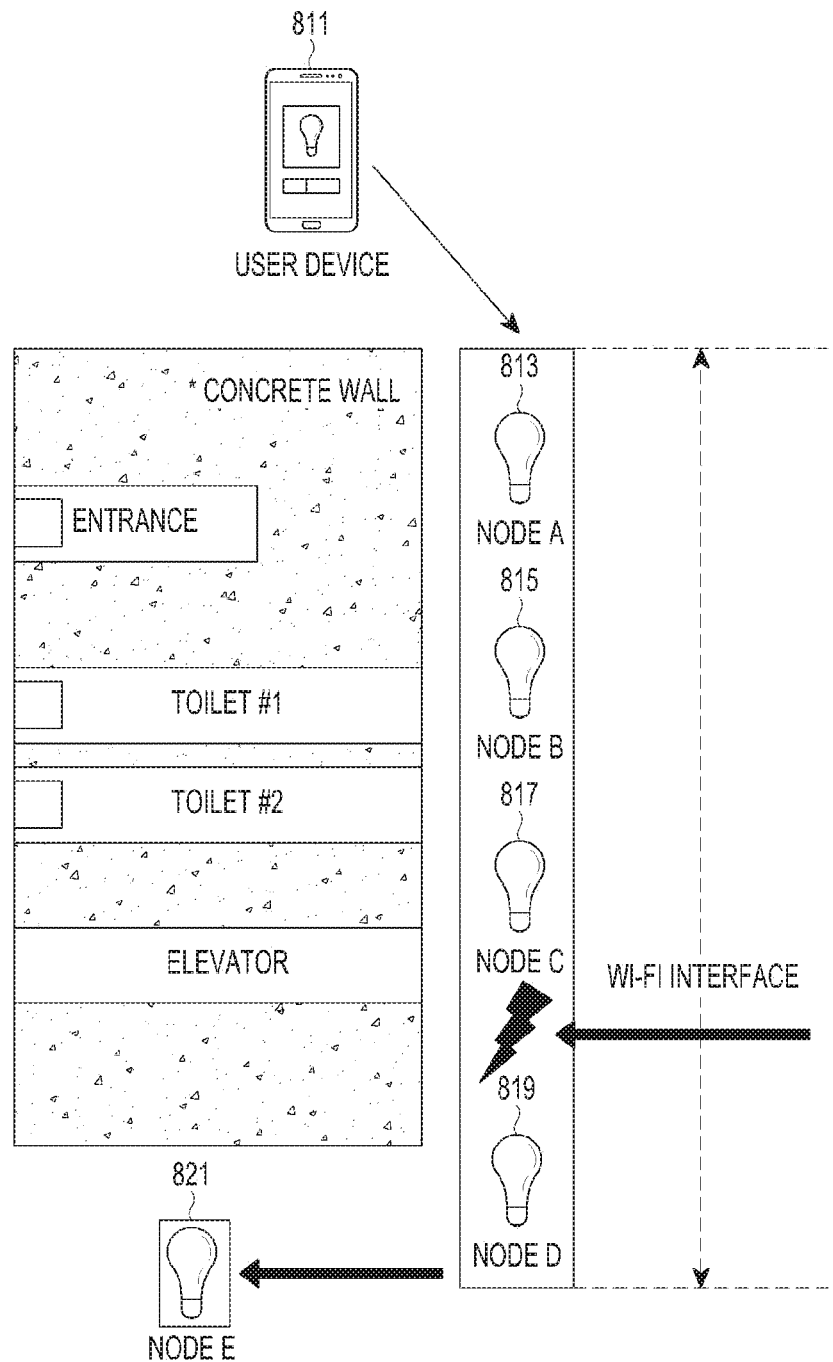
FIG. 8 schematically illustrates an operating process of nodes in a BLE mesh network according to an embodiment of the present disclosure.

FIG. 8 schematically illustrates an operating process of nodes in a BLE mesh network according to an embodiment of the present disclosure.

Referring to FIG. 8, the BLE mesh network includes a user device 811, and a plurality of nodes, i.e., a node A 813, a node B 815, a node C 817, a node D 819, and a node E 821. Here, it will be assumed that the node A 813 operates as a bridge node which directly communicates with the user device 811 and the node E 821 is a final node. Further, it will be assumed that each of the node A 813, the node B 815, the node C 817, the node D 819, and the node E 821 is, for example, a smart LED.

Referring to FIG. 8, the user device 811 may command turn on and/or turn off for the node E 821 as the final node using a mesh packet, and, in FIG. 8, it will be assumed that the user device 811 commands, for example, turn on for the node E 821.

In FIG. 8, it will be assumed that a Wi-Fi interface is used as an interface. It will be assumed that a Wi-Fi access point (AP) uses two wired/wireless routers, and supports an IEEE 802.11g (CH 4/13, N604S/N8004) standard in the Wi-Fi interface. Further, it will be assumed that traffic configurations are an iperf user datagram protocol (UDP), 20 Mbps from the user device 811 in the Wi-Fi interface.

In the same environment as shown in FIG. 8, a fail rate in a BLE mesh network according to an embodiment of the present disclosure is different from a failure rate in a general BLE mesh network as shown in Table 1, and it will be understood that, according to this, performance of the BLE mesh network according to an embodiment of the present disclosure may be enhanced compared to performance of the general BLE mesh network.

TABLE 1

|  | Fail Rate (present disclosure) | Fail Rate (general) |
|---|---|---|
| First Test | 1/20 | 3/20 |
| Second Test | 1/20 | 5/20 |
| Third Test | 1/20 | 4/20 |

As described above, it will be understood that a BLE mesh network according to an embodiment of the present disclosure is effective in the following aspects.

(1) Enhancement of Communication Reliability According to Retransmission

A general BLE mesh network does not consider data loss and considers unconditional flooding. However, in a BLE mesh network according to an embodiment of the present disclosure, if it is detected that there is lost data though an overhearing process, the lost data may be retransmitted. So, a BLE mesh network according to an embodiment of the present disclosure may have enhanced communication reliability compared to a general BLE mesh network.

(2) Elimination of ACK Delay

In a BLE mesh network according to an embodiment of the present disclosure, a hop-by-hop ACK through an overhearing process is possible, so ACK delay which has occurred in a general BLE mesh network may be prevented.

(3) Decrease of Collision Occurrence Probability

In a BLE mesh network according to an embodiment of the present disclosure, flooding which is based on channel status, not unconditional flooding, is implemented, so collision occurrence probability may be decreased compared to a general BLE mesh network.

An operating process of nodes in a BLE mesh network according to an embodiment of the present disclosure has been described with reference to FIG. 8, and another example of an inner structure of a node in a BLE mesh network according to an embodiment of the present disclosure will be described with reference to FIG. 9.

Figure 9:
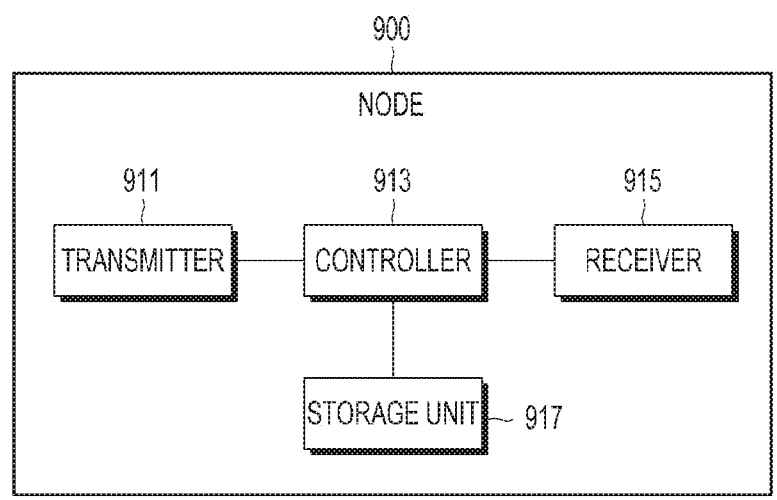
FIG. 9 schematically illustrates another example of an inner structure of a node in a BLE mesh network according to an embodiment of the present disclosure.

FIG. 9 schematically illustrates another example of an inner structure of a node in a BLE mesh network according to an embodiment of the present disclosure.

Referring to FIG. 9, a node 900 includes a transmitter 911, a controller 913, a receiver 915, and a storage unit 917.

The controller 913 controls the overall operation of the node 900, and more particularly, controls an operation related to an operation of transmitting/receiving a signal in a BLE mesh network according to an embodiment of the present disclosure. The operation related to the operation of transmitting/receiving the signal in the BLE mesh network according to an embodiment of the present disclosure is identical to an operation which has been described with reference to FIGS. 4 to 8, and a detailed description thereof will be omitted herein.

The transmitter 911 transmits various signals and various messages to other nodes, a user device, and/or the like included in the BLE mesh network under a control of the controller 913. The various signals and the various messages transmitted by the transmitter 911 are identical to various signals and various messages which have been described in FIGS. 4 to 8, and a detailed description thereof will be omitted herein.

The receiver 915 receives various signals and various messages from the other nodes, the user device, and/or the like included in the BLE mesh network under a control of the controller 913. The various signals and the various messages received by the receiver 915 are identical to various signals and various messages which have been described in FIGS. 4 to 8, and a detailed description thereof will be omitted herein.

The storage unit 917 stores a program, various data, and/or the like related to the operation related to the operation of transmitting/receiving the signal in the BLE mesh network according to an embodiment of the present disclosure.

The storage unit 917 stores the various signals and various messages received by the receiver 915 from the other nodes, the user device, and/or the like.

Although the transmitter 911, the controller 913, the receiver 915, and the storage unit 917 are described as separate units in the node 900 in FIG. 9, it is to be understood that the node 900 may be implemented with a form into which at least two of the transmitter 911, the controller 913, the receiver 915, and the storage unit 917 may be incorporated.

The node 900 may be implemented with one processor.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for transmitting a signal by a node in a mesh network, comprising:
    transmitting a mesh packet by flooding the mesh packet a number of times corresponding to a relay count that is determined based on a comparison of a number of acknowledgements (ACKs) to a first value;
    after transmitting the mesh packet, receiving at least one packet transmitted from at least one neighbor node other than the node;
    determining whether the at least one neighbor node has normally received the mesh packet based on the at least one packet; and
    retransmitting the mesh packet upon determining that there is a need for retransmitting the mesh packet based on the determined result.

2. The method of claim 1, wherein determining whether the at least one neighbor node has normally received the mesh packet based on whether the mesh packet is identical the at least one packet comprises:
- if the at least one packet is a packet managed by the node, increasing the number of ACKs by a set value;
- if a retransmission timer expires and the at least one packet is identical to the mesh packet, determining whether the number of ACKs is equal to a number of the at least one neighbor node; and
- if the number of ACKs is unequal to the number of the at least one neighbor node, determining that the at least one neighbor node has not normally received the mesh packet.

3. The method of claim 2, wherein determining whether the at least one neighbor node has normally received the mesh packet based on the at least one packet further comprises:
- if the number of ACKs is equal to the number of the at least one neighbor node, determining that the at least one neighbor node has normally received the mesh packet.

4. The method of claim 2, wherein the at least one packet is included in a message list managed by the node.

5. The method of claim 2, wherein determining that there is the need for retransmitting the mesh packet based on the determined result comprises:
- if the at least one neighbor node has not normally received the mesh packet, determining that there is a need for retransmitting the mesh packet.

6. The method of claim 3, further comprising:
- initializing the retransmission timer if there is not a need for retransmitting the mesh packet based on the determined result.

7. The method of claim 1, further comprising:
- determining the relay count used for transmitting the mesh packet.

8. The method of claim 7, wherein determining the relay count comprises:
- if the at least one packet is a packet managed by the node, increasing the number ACKs by a set value;
- determining whether a retransmission timer expires;
- if the retransmission timer does not expire, determining whether a channel status timer expires;
- if the channel status timer does not expire and the retransmission timer expires, determining whether the number of ACKs is greater than the first value; and
- if the number of ACKs is greater than the first value, determining the relay count based on a minimum relay count.

9. The method of claim 8, wherein, if the number of ACKs is greater than the first value, determining the relay count based on the minimum relay count comprises:
- if the relay count is not greater than the minimum relay count, setting the relay count to the minimum relay count; and
- determining a final relay count based on the relay count which is set to the minimum relay count.

10. The method of claim 9, wherein, if the number of ACKs is greater than the first value, determining the relay count based on the minimum relay count comprises:
- if the relay count is greater than the minimum relay count, decreasing the relay count by a second value; and
- determining a final relay count based on the relay count which is decreased by the second value.

11. The method of claim 8, wherein determining the relay count comprises:
- if the number of ACKs is not greater than the first value, determining the relay count based on a maximum relay count.

12. The method of claim 11, wherein, if the number of ACKs is not greater than the first value, determining the relay count based on the maximum relay count comprises:
- if the relay count is not less than the maximum relay count, setting the relay count to the maximum relay count; and
- determining a final relay count based on the relay count which is set to the maximum relay count.

13. The method of claim 12, wherein, if the number of ACKs is not greater than the first value, determining the relay count based on the maximum relay count comprises:
- if the relay count is less than the maximum relay count, increasing the relay count by a second value; and
- determining a final relay count based on the relay count which is increased by the second value.

14. A node for transmitting a signal in a mesh network, the node comprising:
- a transmitter configured to transmit a mesh packet by flooding the mesh packet a number of times corresponding to a relay count that is determined based on a comparison of a number of acknowledgements (ACKs) to a first value;
- a receiver configured to receive at least one packet transmitted from at least one neighbor node other than the node after transmitting the mesh packet; and
- a controller configured to:
  - determine whether the at least one neighbor node has normally received the mesh packet based on whether the at least one packet,
  - retransmit the packet upon determining that there is a need for retransmitting the mesh packet based on the determined result.

15. The node of claim 14, wherein the controller is configured to:
- increase a number of ACKs by a set value if the at least one packet is a packet managed by the node;
- determine whether the number of ACKs is equal to a number of the at least one neighbor node if a retransmission timer expires and the at least one packet is identical to the mesh packet; and
- determine that the at least one neighbor node has not normally received the mesh packet if the number of ACKs is unequal to the number of the at least one neighbor node.

16. The node of claim 15, wherein the controller is configured to:
- determine that the at least one neighbor node has normally received the mesh packet if the number of ACKs is equal to the number of the at least one neighbor node.

17. The node of claim 15, wherein the at least one packet is included in a message list managed by the node.

18. The node of claim 15, wherein the controller is configured to:
- determine that there is a need for retransmitting the mesh packet if the at least one neighbor node has not normally received the mesh packet.

19. The node of claim 16, wherein the controller is configured to:
- initialize the retransmission timer if there is not a need for retransmitting the mesh packet based on the determined result.

* * * * *